(12) United States Patent
Horne

(10) Patent No.: US 9,405,917 B2
(45) Date of Patent: Aug. 2, 2016

(54) MECHANISM FOR PROTECTING INTEGRATED CIRCUITS FROM SECURITY ATTACKS

(71) Applicant: Apple Inc., Cupertino, CA (US)

(72) Inventor: Stephen C Horne, Austin, TX (US)

(73) Assignee: Apple Inc., Cupertino, CA (US)

( * ) Notice: Subject to any disclaimer, the term of this patent is extended or adjusted under 35 U.S.C. 154(b) by 75 days.

(21) Appl. No.: 14/291,836

(22) Filed: May 30, 2014

(65) Prior Publication Data

US 2015/0347762 A1    Dec. 3, 2015

(51) Int. Cl.
*G06F 21/60* (2013.01)
*G06F 7/58* (2006.01)
*G06F 9/38* (2006.01)
*G06F 1/14* (2006.01)
*G06F 9/44* (2006.01)

(52) U.S. Cl.
CPC ...... *G06F 21/60* (2013.01); *G06F 1/14* (2013.01); *G06F 7/58* (2013.01); *G06F 9/3867* (2013.01); *G06F 9/44* (2013.01)

(58) Field of Classification Search
USPC ............................ 713/194; 726/1; 719/318
See application file for complete search history.

(56) References Cited

U.S. PATENT DOCUMENTS

| | | |
|---|---|---|
| 7,115,912 B2 | 10/2006 | Kash et al. |
| 8,410,583 B2 | 4/2013 | Walker et al. |
| 2003/0084336 A1* | 5/2003 | Anderson ............ G06F 7/00 726/36 |
| 2011/0055851 A1* | 3/2011 | Potkonjak .......... G06F 21/74 719/318 |
| 2011/0185110 A1* | 7/2011 | Smigelski .......... G06F 21/79 711/103 |

FOREIGN PATENT DOCUMENTS

WO    2010011399 A2    1/2010

OTHER PUBLICATIONS

Skorobogatov, S.P., Anderson, R.J.; Optical Fault Induction Attacks; Cryptographic Hardware and Embedded Systems—CHES 2002. 4th International Workshop Revised Papers (Lecture Notes in Computer Science vol. 2523), 2-12, 2002; ISBN-10: 3 540 00409 2; Conference: Aug. 13-15, 2002, Redwood Shores, CA, USA; Publisher: Springer-Verlag, Berlin, Germany.

* cited by examiner

*Primary Examiner* — Jeffrey Pwu
*Assistant Examiner* — Samuel Ambaye
(74) *Attorney, Agent, or Firm* — Meyertons, Hood, Kivlin, Kowert & Goetzel, PC.

(57) ABSTRACT

A mechanism for protecting integrated circuits (IC) from security attacks includes an IC having components that may store one or more data items and may perform a number of functions and which produce resulting events. The IC may also include a security module that may modify signals and events provided to the components such that the resulting events are modified in a non-effectual way but that causes the events to be non-deterministic relative to an event that is external to the integrated circuit when the resulting events are viewed externally to the IC. This may result in obscuring the data, and the functions from being observed from external to the IC, particularly when using an IR laser probe.

20 Claims, 8 Drawing Sheets

Code sequence 1
BZ   Normal
NOP 1
NOP 2
Normal: Code sequence 2

MECHANISM FOR PROTECTING INTEGRATED CIRCUITS FROM SECURITY ATTACKS

BACKGROUND

1. Technical Field

This disclosure relates to integrated circuits, and more particularly to integrated circuit security.

2. Description of the Related Art

Integrated circuits (ICs) are commonly involved in various secure transactions or computations. For example, encryption is used to keep secret data or messages that are used in financial transactions, personal communications, and communications relating to national security. Great care is taken to protect this information, and conversely, malicious persons or organizations expend great effort to uncover these secrets.

ICs may provide security in part because of their very small size and the difficulty of directly accessing electrical signals inside the IC. However, attackers have developed and continue to develop a variety of methods to infer the data contained within or the computations being performed inside ICs. These methods include analyzing power consumption variation, monitoring electromagnetic emissions, partial deprocessing of the IC, mechanical probing, and many others.

A typical modern IC may have numerous layers of wiring overlaying the transistors. Access to any particular wire is usually blocked by overlaying wires. This is a problem not only for malicious attackers, but for chip debug and failure analysis. Consequently, analysis techniques have been developed that permit access to transistors and nodes from the backside of the IC. One such analysis technique is known as back side infrared (IR) probing. Since silicon is transparent to IR light, IR lasers may be used to penetrate the back side of the IC and to probe the transistor structures within the silicon. As shown in FIG. 1, a prior art IC 20 in a package 10 is being electrically probed on the back side 25 by an infrared laser probe 30. The IC is mounted in the package in a flip-chip configuration such that the top layer metal is on the bottom as drawn and coupled to the package using solder balls 12. The IR laser probe 30 produces an IR beam 35 which penetrates through the back side silicon 25 to nodes formed on the front side 28 of the silicon.

A number of back side probing techniques have been developed. Some allow observation of voltages or voltage waveforms, while other techniques allow the function of transistors to be modified via IR light. Attackers may employ these techniques to determine the nature of the chip operation and to discover the data present in the IC at any particular time.

The backside probing method that provides the greatest amount of detail in terms of time-varying signal information is the laser voltage probe. This method generally requires that the IC operation is repeated many times, and the signal waveform is acquired by repeatedly sampling one or more electrical nodes (usually a transistor source or drain). Repeated probing is required both to increase the signal-to-noise ratio of the acquired signal, and to sample the signal at multiple points in time relative to the sequence of events in the IC. An externally accessible timing event such as reset for example, may be used as a reference point in determining exactly at what time to take the next optical signal sample. Because each sample may have a very short duration and may have a low signal-to-noise ratio, many samples may be needed to build a waveform with an interesting length of time.

SUMMARY OF THE EMBODIMENTS

Various embodiments of a mechanism for protecting integrated circuits from security attacks are disclosed. Broadly speaking, an integrated circuit (IC) is contemplated that includes components that may store one or more data items and may perform a number of functions and which produce resulting events. The IC may also include a security module that may modify signals and events provided to the components such that the resulting events are modified in a non-effectual way but that causes the events to be non-deterministic relative to an event that is external to the integrated circuit when the resulting events are viewed externally to the IC. This may result in obscuring the data, and the functions from being observed from external to the IC, particularly when using an IR laser probe.

In one embodiment, an IC includes one or more components each configured to perform one or more functions including one or more resulting events. The IC also includes a security module that may be configured to modify one or more signals within the one or more components to cause at least some of the one or more resulting events to be non-deterministic relative to an event that is external to the integrated circuit when the one or more resulting events are viewed from external to the integrated circuit, thereby obscuring the one or more functions from being identified external to the integrated circuit.

Figure 1:
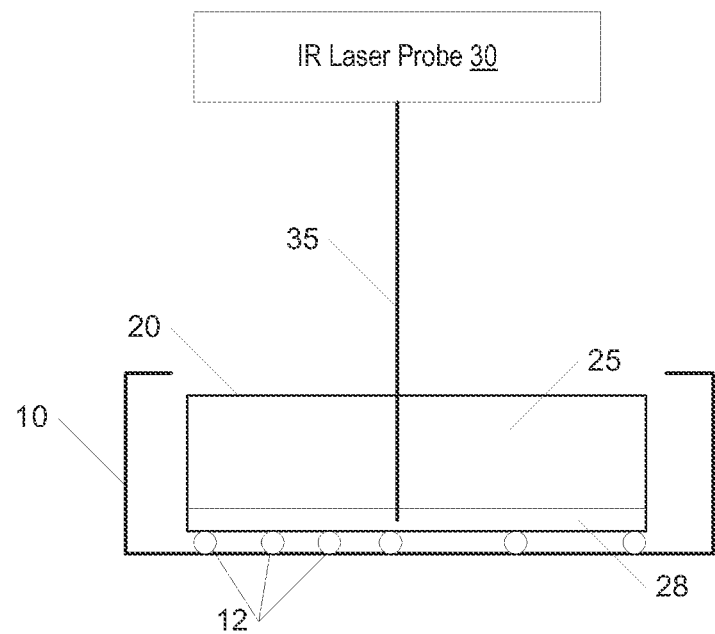
FIG. 1 is a prior art conceptual diagram of one embodiment of an integrated circuit in a package being electrically probed on the back side by an infrared laser probe.

Specific embodiments are shown by way of example in the drawings and will herein be described in detail. It should be understood, however, that the drawings and detailed description are not intended to limit the claims to the particular embodiments disclosed, even where only a single embodiment is described with respect to a particular feature. On the contrary, the intention is to cover all modifications, equivalents and alternatives that would be apparent to a person skilled in the art having the benefit of this disclosure. Examples of features provided in the disclosure are intended to be illustrative rather than restrictive unless stated otherwise.

As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph (f), interpretation for that unit/circuit/component.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

Figure 2:
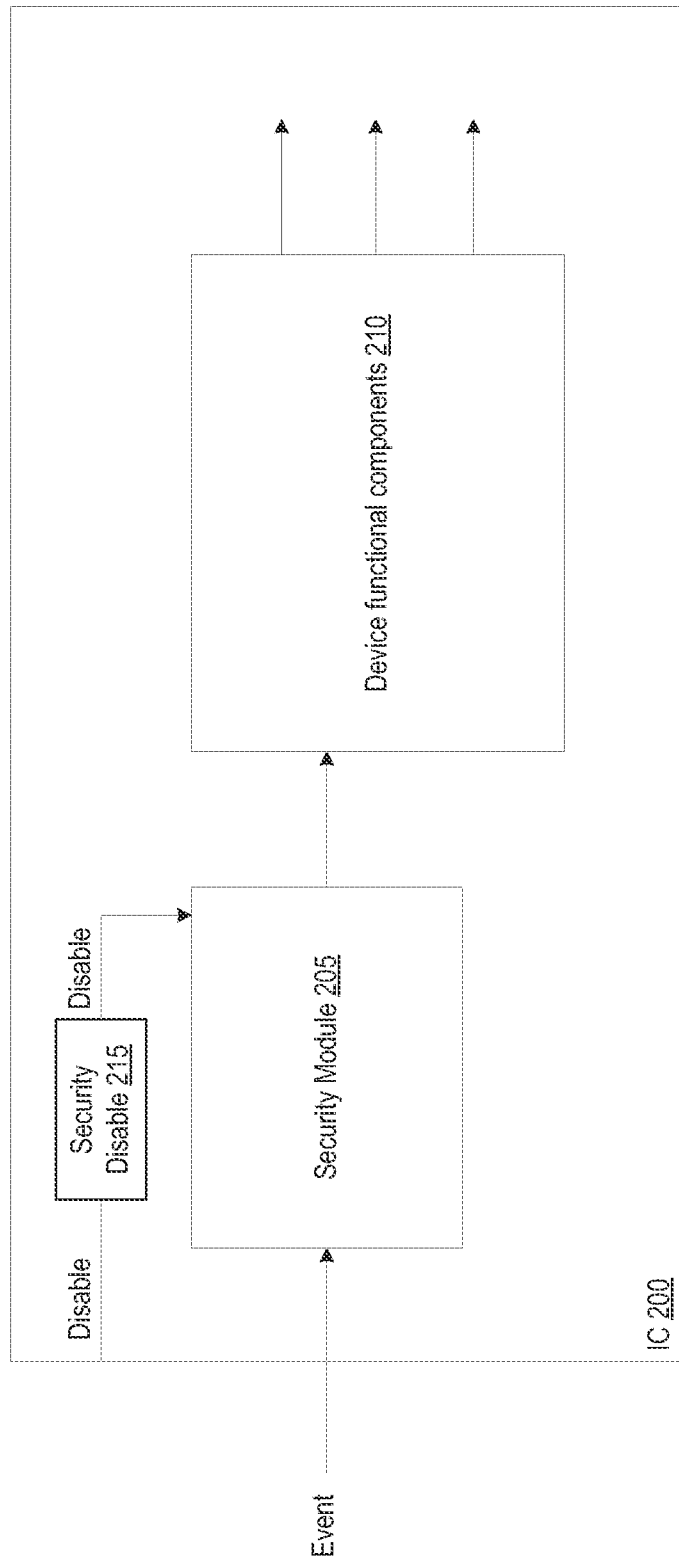
FIG. 2 is a block diagram of one embodiment of an integrated circuit including a security module.

Turning now to FIG. 2, a block diagram of one embodiment of an integrated circuit including a security module is shown. In the illustrated embodiment, the integrated circuit 200 includes a security module 205 coupled to a functional component block 210. The integrated circuit 200 also includes a security disable unit 215 that is coupled to the security module 205.

In various embodiments, the functional component block 210 may be representative of any type of component that may be on an integrated circuit. The functional component block 210 may include one or more logic circuits that may perform one or more functions that include one or more events. For example, in one embodiment, the logic circuits may form a processor having a pipeline that executes instructions. In another embodiment, the logic circuits may form a memory controller, a memory or other storage device. In other embodiments, the logic circuits may form various graphics components. In one embodiment, the security module 205 may be implemented in hardware, software, or a combination. In addition, in various implementations the circuits that embody the security module 205 may be clustered together, or they may be distributed throughout the IC 200, as desired.

In one embodiment, unless disabled, the security module 205 may be configured to obscure what is going on inside the IC 200 particularly when events internal to the IC 200 are being observed from external to the IC 200. More particularly, the security module 205 may be configured to modify signals within the functional component block 210 to cause various events within the functional component block 210 and events that are produced by the functional component block 210 to be non-deterministic relative to an event that is external to the IC 200. For example, as described in greater detail below, if an external observer using an IR probe is observing a node within the functional component block 210 and using an external reset signal as a reference event, the security module 205 may modify the internal signals so that the observer cannot determine with certainty what the signals are doing, or what data may be contained in the functional component block 210. Depending on the type of circuits formed in the functional component block 210, there may be a variety of ways to modify the internal signals. These ways are described below in conjunction with the descriptions of the embodiments shown FIG. 3 through FIG. 9. It is noted that other external signals may be used as reference signals. It is further noted that the security module 205 may be disabled via the disable signal during testing and debug of the IC 200. However, as described in conjunction with the description of FIG. 10, once the security module 205 is permanently enabled for production, the security module 205 may not be disabled again.

As mentioned above, unless disabled the security module 205 may obscure what is going on inside the IC 200. During manufacturing, it may be necessary or desirable to be able to observe internal signals during, for example, debug and manufacturing device testing. Accordingly, a disable signal may be provided to the security disable unit 215, which may, in turn, disable the security module 205. In one embodiment, the security disable unit 215 may be accessible using an encryption/private key security protocol. In another embodiment, the disable signal may be applied externally to the IC 200 via a pin/pad arrangement that may not be available once the IC 200 has completed manufacturing. For example, the pin or pad may not be accessible once the IC is singulated from the wafer and/or placed into a package.

Figure 10:
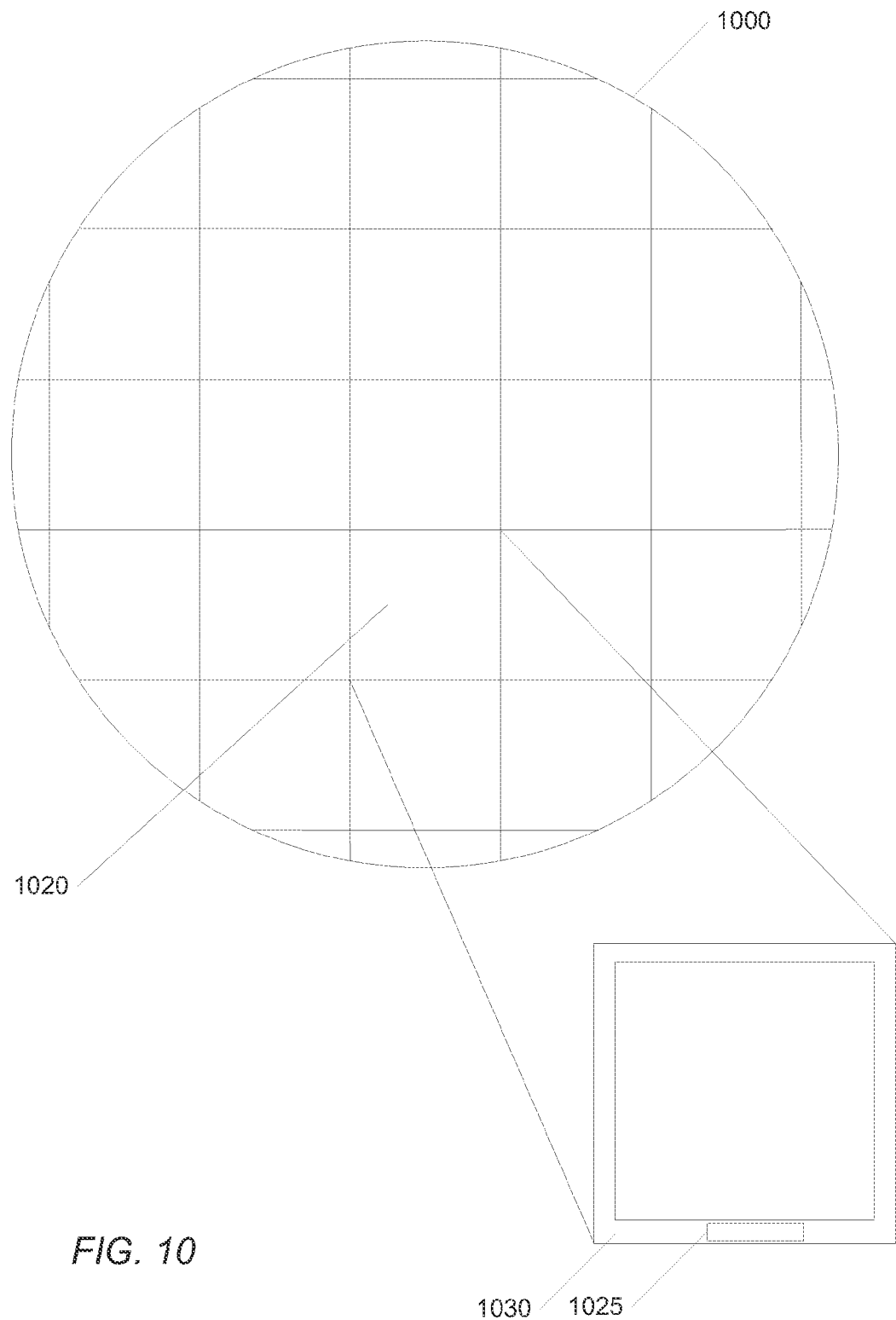
FIG. 10 is a top view diagram of a semiconductor wafer having multiple integrated circuits and a disable unit in the wafer scribe lines.

In FIG. 10, a top view diagram of a semiconductor wafer having multiple integrated circuits and a disable unit in the wafer scribe lines is shown. The silicon wafer 100 includes a number of integrated circuits such as integrated circuit 1020. Each integrated circuit is separated by a scribe line area 1030 as shown in the exploded view of integrated circuit 1020. Once the wafer has completed testing, using a wafer saw the wafer is cut up to separate the individual integrated circuits. The wafer saw cuts along the scribe lines and the width of the wafer saw corresponds to the scribe area 1030. As shown, in one embodiment, a disable circuit 1025 is manufactured in the scribe area. The disable circuit 1025 may be configured to provide a disable signal to the IC 1020 during for example, wafer testing as described above. Once the wafer is cut up, the disable circuit 1025 is destroyed thereby making it impractical or impossible to further disable the security module 205 of FIG. 2 in some embodiments.

Figure 3:
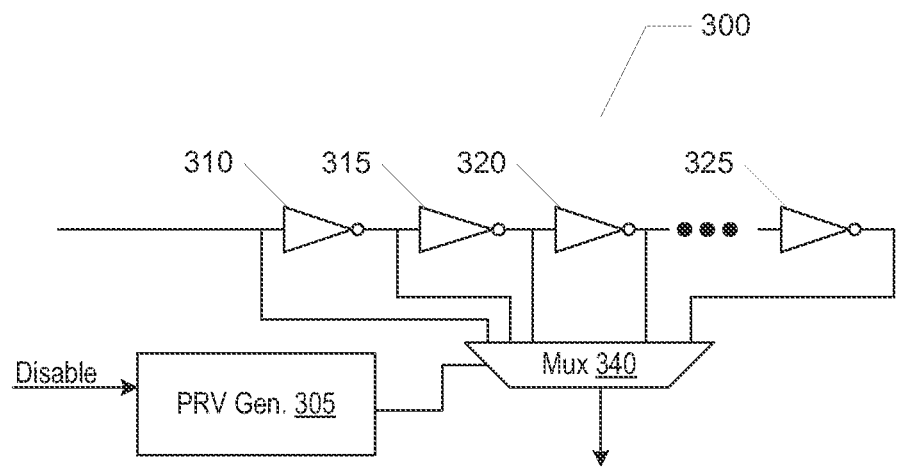
FIG. 3 is a block diagram of one embodiment of the security module shown in FIG. 2.

Referring now to FIG. 3, a block diagram of one embodiment of the security module of FIG. 2 is shown. The security module 300 of FIG. 3 includes a pseudo-random value (PRV) generator 305 coupled to the select input of a multiplexer (mux) 340. The security module 300 also includes a number of delay gates connected in a delay chain. In the illustrated embodiment, the gates are shown as inverter gates labeled 310 through 325. However, in other embodiments each delay gate may be any type of logic gate. The output of each inverter is coupled to a respective input to the mux 340.

The PRV generator 305 may generate a pseudo random value that may be used as a select signal to select which inverter output is provided as an output of the mux 340. For example, in one embodiment, the input to the inverter chain may be a master reset signal of the IC 200 of FIG. 2. As the PRV generator 305 randomly selects an inverter output, the reset signal is delayed by a random amount to the rest of the components such as the functional component block 210 of the IC 200 of FIG. 2. Thus, in the event that an observer were monitoring one or more nodes within the IC 200, and using the external master reset signal as a reference, the resultant signals and events produced by the functional component bock 210 may be non-deterministic relative to the reset signal. It is noted that the input to the inverter chain may be any signal that when delayed as described above, may make operation of the functional component block 210 non-deterministic. It is noted that the terms random and pseudo-random are used interchangeably. It is further noted that while the PRV generator 305 is a pseudo random generator, it is understood that the randomness of its output is random enough for this purpose.

As described above, the security module 300 may be disabled in response to receiving an asserted disable signal. In one embodiment, when disabled, the PRV generator 305 may be configured to output a constant value. The constant value may select an undelayed input to the mux 340.

Figure 4:
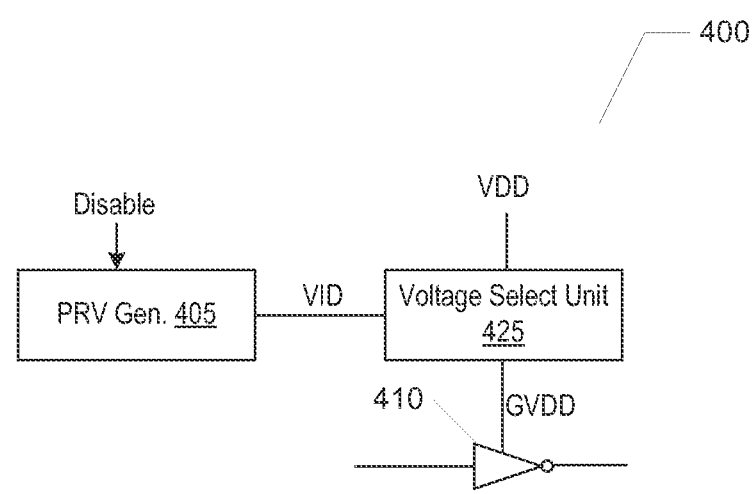
FIG. 4 is a block diagram of another embodiment of the security module shown in FIG. 2.

Referring to FIG. 4, a block diagram of one embodiment of the security module shown in FIG. 2 is shown. The security module 400 of FIG. 4 includes a pseudo-random value (PRV) generator 405 coupled to a voltage select unit 425, the output of which is in turn coupled to the inverter gate 410 as the inverter gate supply voltage GVDD.

In one embodiment, the voltage select unit 425 may be implemented as an adjustable voltage supply device. In response to a given voltage identifier (VID), the voltage select unit 425 may output a corresponding voltage. There are various ways to implement such a device. For example, in one embodiment each VID may select a particular configuration of an internal voltage divider network by turning on and off various transistors coupled to the divider network. Thus each respective VID value may select a different VDD by effectively selecting a different divider tap. In another embodiment, the VID input may be the select input of a multiplexer (mux) (not shown). The output of the mux may be coupled to the GVDD input of the inverter gate 410. Each of the inputs to the mux may be coupled to a respective tap from a divider network, for example, and each respective VID value may select a different tap and thus a different VDD.

In one embodiment, during operation the PRV generator 405 randomly selects a different VDD input to supply voltage to the inverter gate 410. This causes the propagation delay of the inverter gate 410 to change an inverter output. More particularly, as the voltage increases the gate delay may decrease and vice versa. Accordingly, if the input to the inverter gate 410 is the master reset as in the example described above in conjunction with the description of FIG. 3, internally the reset signal is delayed by a random amount to the rest of the components such as the functional component block 210 of the IC 200 of FIG. 2. Thus, in the event that an observer were monitoring one or more nodes within the IC 200, and using the external master reset signal as a reference, the resultant signals and events produced by the functional component bock 210 may be non-deterministic relative to the reset signal.

Similar to the PRV generator described in FIG. 3, the PRV generator 405 may also be disabled when the disable signal is asserted. In one embodiment, when disabled, the PRV generator 405 may be configured to output a constant value. The constant value may select one of the VID input to the voltage select unit 425.

Figure 5:
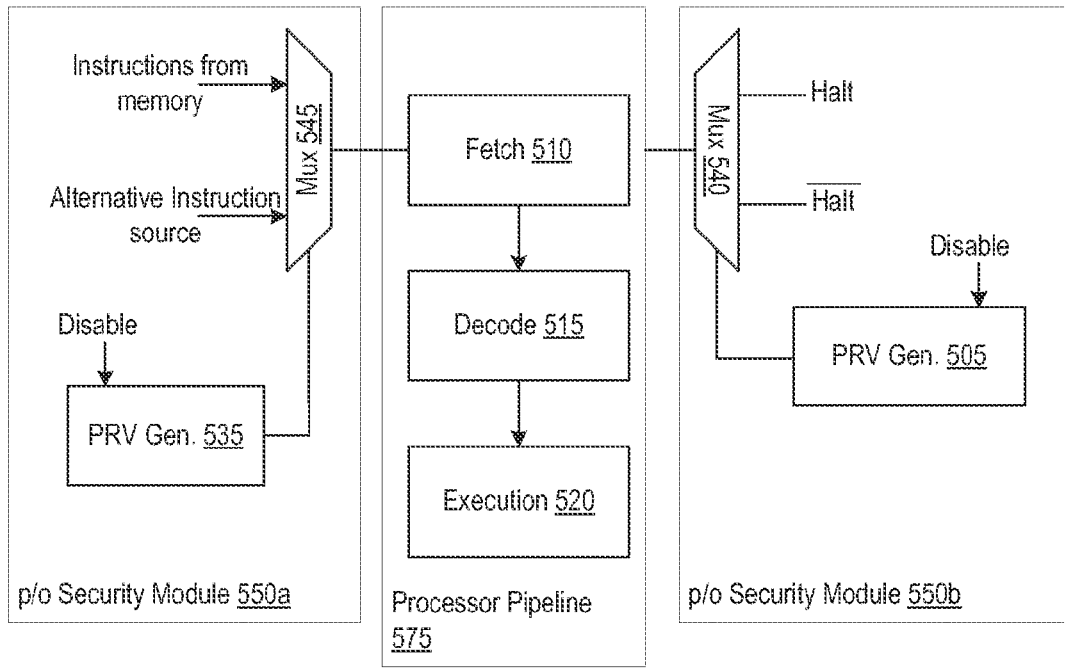
FIG. 5 is a block diagram illustrating more detailed aspects of an embodiment of the integrated circuit of FIG. 2 and FIG. 3.

Turning to FIG. 5, a block diagram illustrating more detailed aspects of an embodiment of the integrated circuit of FIG. 2 is shown. In the embodiment of FIG. 5, the device functional components block 210 of FIG. 2 has been implemented as a processor. Accordingly, a portion of the execution pipeline 575 of the processor is shown coupled to portions of the security module 550a and 550b. The processor pipeline 575 includes a fetch unit 510 coupled to a decode unit 515, which is coupled to an execution unit 520. The security module portion 550a includes a pseudo-random value (PRV) generator 535 coupled to the select input of a multiplexer (mux) 545. The output of the mux 545 is coupled to the fetch unit 510 of the processor pipeline 575. The security module portion 550b includes a pseudo-random value (PRV) generator 505 coupled to the select input of a mux 540. The output of the mux 540 is coupled to the processor pipeline 575.

In one embodiment, during operation of the processor pipeline 575, the PRV generator 535 may randomly select either instructions from memory, or instructions from an alternative instruction source as an input to the fetch unit 510. The instructions from memory include program instructions being executed by the processor. However, the instructions from the alternative source may be instructions stored in another memory, or a different location in memory and which do not serve a purpose other than to cause a pipeline delay. For example, no operation (NOP) instructions may be fed to the fetch unit, or a series of instructions that simply add zero to a particular register.

In addition, during operation of the processor pipeline 575, the PRV generator 505 may randomly select either a halt signal or halt signal to the processor pipeline 575. In response to receiving an asserted halt signal, the processor pipeline 575 may stall for a predetermined number of execution cycles. In one embodiment, the halt signal may stall the fetch unit 510 from fetching instructions, thereby causing instruction execution to be non-deterministic relative to an external event. Similar to the embodiments described above, the PRV generators 505 and 535 may be disabled in response to receiving an asserted disable signal.

Figure 6:
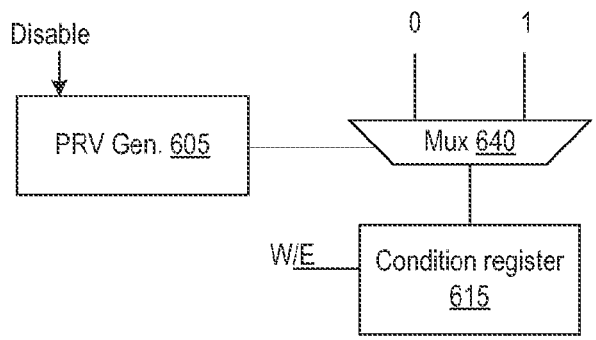
FIG. 6 is a block diagram of another embodiment of the security module shown in FIG. 3.

In implementations involving a processor and instruction execution, it may be possible to use branch instructions to make the instruction execution non-deterministic relative to external events. For example, in FIG. 6, a block diagram of another embodiment of the security module of FIG. 3 is shown. As shown in FIG. 6, a pseudo-random value (PRV) generator 605 is coupled to the select input of a mux 640. The output of the mux 640 is coupled to a register that may be used as the conditional value in evaluating a branch instruction. Accordingly, the register is labeled condition register 615. The inputs to the mux 640 are logic values of zero and one, respectively. It is noted that in other embodiments, other values including multi-bit values may be used.

Also shown in FIG. 6 is an example program code segment that includes a code sequence 1 which may represent any of a variety of program instructions followed by a branch if zero instruction (BZ) to a label Normal. The branch instruction is followed by a NOP 1 instruction and a NOP 2 instruction, which are followed by the Normal label which starts a code sequence 2. It is noted that the NOP 1 and NOP 2 instructions are simply representative of any non-effectual code that may only serve to create a delay. For example, as mentioned above, adding zero to a particular register may be considered non-effectual since there is no real effect from the execution of those instructions. It is noted that NOP 1 and NOP 2 may be representative of the same ineffectual instructions or they may be different, as desired.

During program execution, the code sequence 1 is executed followed by the branch if zero instruction, during which the condition register 615 is evaluated to see if it is zero. If it is zero the code branches to the Normal label and code sequence 2 is executed. However, if the value in the condition register 615 is non-zero, then the two NOP instructions are executed in the shadow of the branch instruction, followed by the code sequence 2 instructions. In either case, the results of program execution would effectively be the same with the exception of the time difference to execute the instructions in the two paths. Thus, during operation the PRV generator 605 may randomly select via the mux 640, a zero or a one to be written into the condition register 615. Each time the branch code segment is executed, the branch may or may not be taken in a non-deterministic way. Thus, the changing delays in the code execution may make the instruction execution non-deterministic relative to external events.

Figure 7:
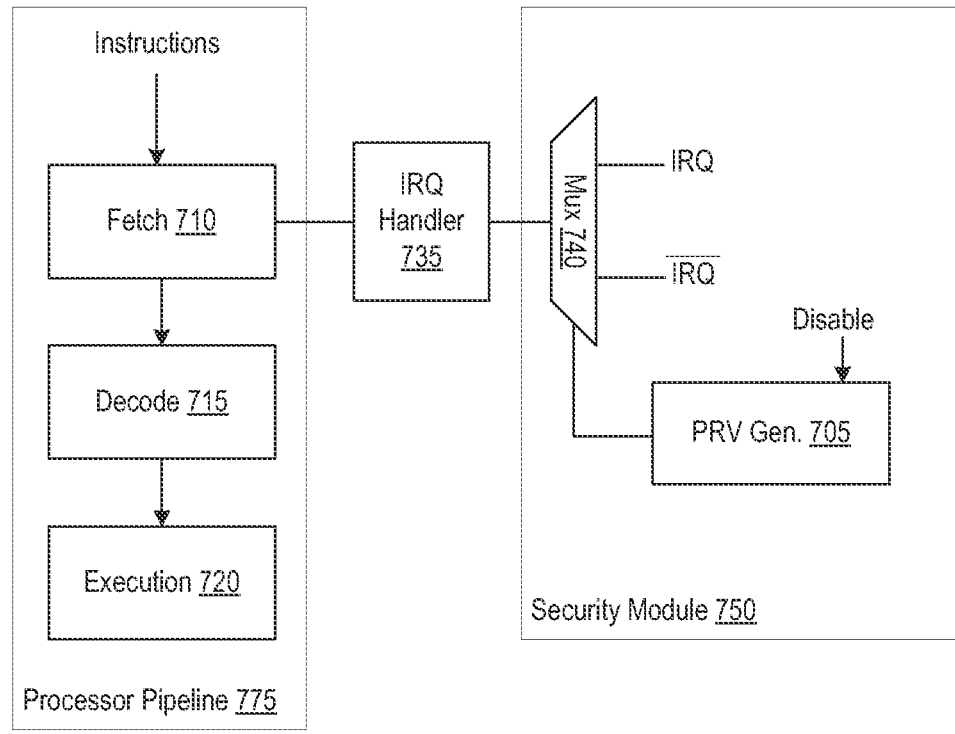
FIG. 7 is a block diagram illustrating more detailed aspects of an embodiment of the integrated circuit of FIG. 2 and FIG. 3.

In other implementations involving a processor and instruction execution, it may be possible to use the interrupt request (IRQ) handler and interrupt service routines to make the instruction execution non-deterministic relative to external events. More particularly, in FIG. 7, a block diagram illustrating more detailed aspects of an embodiment of the integrated circuit of FIG. 2 and FIG. 3 is shown. In the embodiment of FIG. 7, a portion of an execution pipeline 775 of a processor is shown coupled to an IRQ handler 735, which is in turn coupled to a security module 750. The security module 750 includes a pseudo-random value (PRV) generator 705 is coupled to the select input of a mux 740. The output of the mux 740 is coupled to the IRQ handler 735, which is coupled to the processor pipeline 775 which includes a fetch unit 710, a decode unit 715, and an execution unit 720.

In one embodiment, during operation of the processor the PRV generator 705 may randomly select either an IRQ signal or $\overline{\text{IRQ}}$ signal to the processor pipeline 775. In some embodiments, an IRQ signal may cause an interrupt, while in other embodiments, the $\overline{\text{IRQ}}$ signal may cause an interrupt. In response to receiving the IRQ signal that corresponds to an interrupt, the IRQ handler may point the fetch unit 710 to instructions in a special interrupt service routine. The service routine instructions may be NOP instructions, or as described above, the instructions may be a series of non-effectual instructions that only serve to create a delay. By randomly causing interrupts to delay the processor pipeline 775, the random delays in the code execution may make the instruction execution non-deterministic relative to external events.

Figure 8:
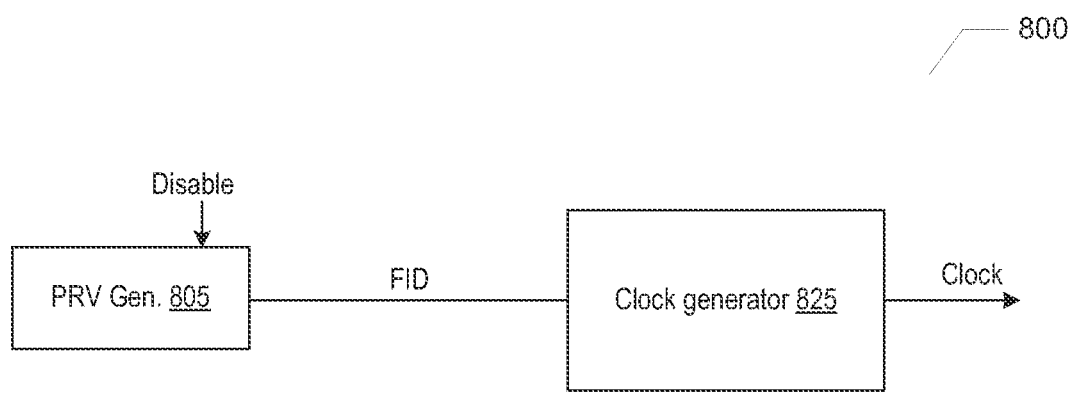
FIG. 8 is a block diagram illustrating more detailed aspects of an embodiment of the integrated circuit of FIG. 2 and FIG. 3.

In another embodiment, it may be possible to make events within the device functional components 210 of IC 200 non-deterministic relative to external events by varying the internal clock period within the device functional components 210. Referring to FIG. 8, a block diagram illustrating more detailed aspects of an embodiment of the integrated circuit of FIG. 2 and FIG. 3 is shown. In FIG. 8, a pseudo-random value (PRV) generator 805 is coupled to a clock generator 825, which provides an output clock signal.

In one embodiment, during operation the (PRV) generator 805 may randomly generate a different frequency identifier signal (FID) that is provided to the clock generator 825. In response, the clock generator 825 may generate a clock signal that has a different frequency and thus a different period. In one embodiment, the period may be changed in fractional multiples of a fundamental system clock period. In other embodiments, the period may be changed in whole multiples of the fundamental system clock period. The output clock may be used by any or all of the components in the device functional components 210. By changing the clock frequency and period in a random way, the events within the IC 200 may be non-deterministic relative to events external to the IC 200.

Figure 9:
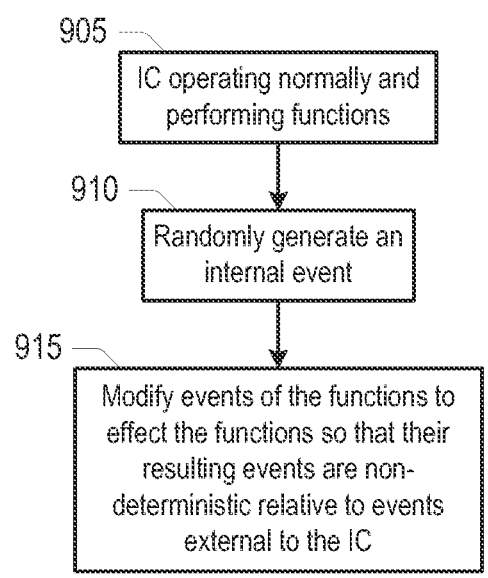
FIG. 9 is a flow diagram describing operational aspects of security module of FIG. 3.

In FIG. 9, a flow diagram describing operational aspects of security module of FIG. 3 is shown. Referring collectively to FIG. 2 through FIG. 99 and beginning in block 905 of FIG. 9, the IC 200 is operating normally and components may be performing one or more functions such as any of a variety of Boolean functions, executing program instructions, rendering graphics images, and the like. Each of these functions may produce one or more resulting events that may be observable from outside the IC 200 with appropriate probing equipment as described above. The security module 205, which includes a pseudo random value generator as described above in the embodiments, may randomly generate and provide to the device functional components events internal to the IC 200 (block 910). The internal events produced by the security module 205 may modify the resulting events of the functions in such a way that the resulting events appear non-deterministic relative to events that are external to the IC 200.

It is noted that each the different embodiments of the security module 205 described above may be used alone or in combination to achieve the desired result.

Figure 11:
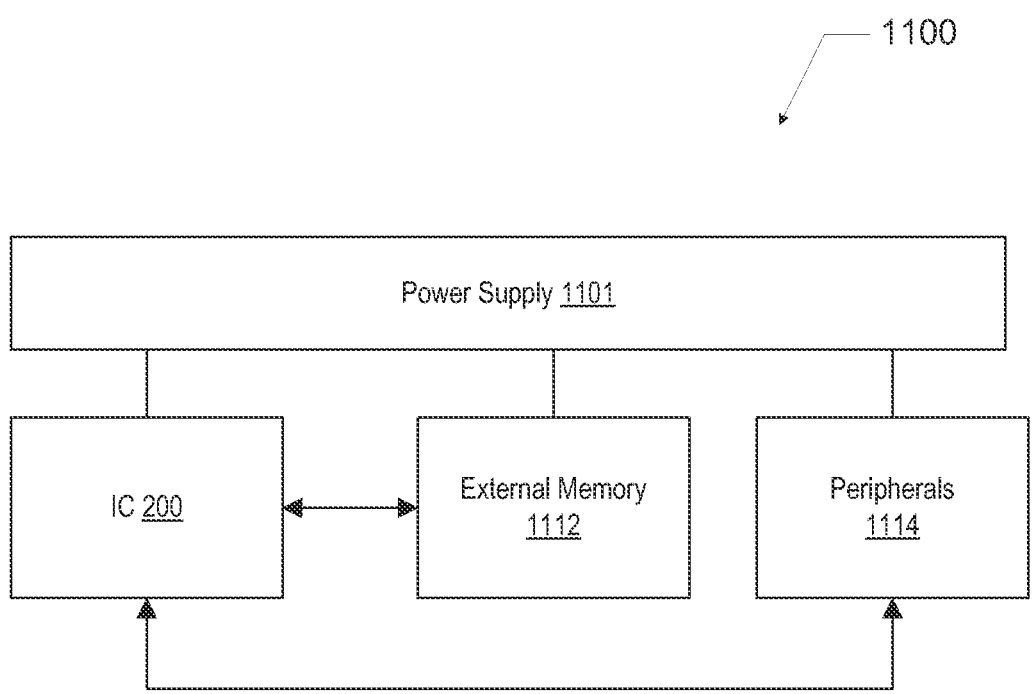
FIG. 11 is a block diagram of one embodiment of a system including the integrated circuit of FIG. 3.

Turning to FIG. 11, a block diagram of one embodiment of a system that includes the integrated circuit 200 of FIG. 2 is shown. The system 1100 includes at least one instance of an integrated circuit (IC) 200 coupled to one or more peripherals 1114 and an external system memory 1112. The system 1100 also includes a power supply 1101 that may provide one or more supply voltages to the IC 410 as well as one or more supply voltages to the memory 1112 and/or the peripherals 1114. In some embodiments, more than one instance of the IC 200 may be included (and more than one memory 1112 may be included as well). It is also noted that various embodiments of IC 200 may also include internal memory (not shown).

The peripherals 1114 may include any desired circuitry, depending on the type of system. For example, in one embodiment, the system 1100 may be included in a mobile device (e.g., personal digital assistant (PDA), smart phone, etc.) and the peripherals 1114 may include devices for various types of wireless communication, such as WiFi, Bluetooth, cellular, global positioning system, etc. The peripherals 1114 may also include additional storage, including RAM storage, solid-state storage, or disk storage. The peripherals 1114 may include user interface devices such as a display screen, including touch display screens or multitouch display screens, keyboard or other input devices, microphones, speakers, etc. In other embodiments, the system 400 may be included in any type of computing system (e.g., desktop personal computer, laptop, tablet, workstation, net top, etc.).

The external memory 1112 may include any type of memory. For example, the external memory 1112 may be in the DRAM family such as synchronous DRAM (SDRAM), double data rate (DDR, DDR2, DDR3, etc.), or any low power version thereof. However, external memory 1112 may also be implemented in SDRAM, RAMBUS DRAM, static RAM (SRAM), or other types of RAM, etc. The external memory 1112 may include one or more memory modules to which the memory devices are mounted, such as single inline memory modules (SIMMs), dual inline memory modules (DIMMs), etc. Alternatively, the external memory 412 may include one or more memory devices that are mounted on the IC 200 in a chip-on-chip or package-on-package implementation. The external memory 1112 may include the memory 1112, in one embodiment.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An integrated circuit comprising:
   one or more circuit blocks each configured to perform one or more functions, wherein at least one of the one or more functions generates one or more resulting events;

a processor including an execution pipeline, wherein the execution pipeline includes a fetch unit; and a security circuit coupled to the one or more circuit blocks and to the processor, wherein the security circuit is configured to:

determine a pseudo-random value for generating a delay; and delay execution of at least one instruction in the execution pipeline dependent upon the pseudo-random value;

wherein at least one of the one or more resulting events occurs dependent upon the at least one instruction; and wherein to delay execution of the at least one instruction, the security circuit is further configured to cause the fetch unit within the execution pipeline to fetch one or more non-effectual program instructions dependent upon the pseudo-random value.

2. The integrated circuit of claim 1, wherein the security circuit is further configured to delay one or more signals by a non-deterministic variable delay.

3. The integrated circuit of claim 1, wherein the security circuit includes a random number generation circuit configured to generate the pseudo-random value.

4. The integrated circuit of claim 2, wherein the non-deterministic variable delay corresponds to a fractional multiple of a system clock period, and wherein the security circuit is configured to vary a point in time when the non-deterministic variable delay occurs.

5. The integrated circuit of claim 1, wherein the security circuit is further configured to use the pseudo-random value to cause the fetch unit to selectively fetch the non-effectual program instructions in a non-deterministic fetch pattern.

6. The integrated circuit of claim 1, wherein the security circuit is further configured to halt the execution pipeline non-deterministically dependent upon the pseudo-random value.

7. The integrated circuit of claim 1, wherein the security circuit is further configured to generate one or more interrupts non-deterministically dependent upon the pseudo-random value, wherein, in response to each of the one or more interrupts, the execution pipeline is configured to execute one or more interrupt service routines, each service routine causing a different non-deterministic pipeline delay.

8. The integrated circuit of claim 1, wherein the one or more signals include a system clock, wherein the security circuit is further configured to delay the system clock by a non-deterministic variable delay, wherein the non-deterministic variable delay corresponds to a fractional multiple of a period of the system clock, and wherein the security circuit is further configured to non-deterministically vary a point in time when the delay occurs.

9. The integrated circuit of claim 1, further comprising test logic configured to inhibit operation of the security circuit during manufacturing testing of the integrated circuit, and wherein the test logic is destroyed subsequent to completion of the manufacturing testing.

10. A method comprising:

performing, by one or more circuit blocks of an integrated circuit, one or more functions including one or more resulting events;

determining a pseudo-random value for generating a delay; and delaying execution of one or more instructions in an execution pipeline of a processor dependent upon the pseudo-random value, wherein the execution pipeline includes a fetch unit;

wherein at least one of the one or more resulting events occurs dependent upon the one or more instructions; and wherein delaying execution of the one or more instructions includes causing the fetch unit within the execution pipeline to fetch one or more non-effectual program instructions dependent upon the pseudo-random value.

11. The method of claim 10, further comprising delaying one or more signals by a non-deterministic variable delay.

12. The method of claim 10, wherein determining a pseudo-random value includes generating, by a random number generator circuit, the pseudo-random value.

13. The method of claim 11, wherein the non-deterministic variable delay corresponds to a fractional multiple of a system clock period.

14. The method of claim 10, wherein delaying the one or more instructions includes halting the execution pipeline non-deterministically dependent upon the pseudo-random value.

15. The method of claim 10, wherein delaying the one or more instructions includes generating one or more interrupts non-deterministically dependent on the pseudo-random value, and in response to each of the one or more interrupts executing one or more interrupt service routines, each service routine causing a different non-deterministic pipeline delay.

16. A system comprising:

a memory;

an integrated circuit coupled to the memory, wherein the integrated circuit includes:

one or more circuit blocks each configured to perform one or more functions, wherein at least one of the one or more functions generates one or more resulting events;

a processor including an execution pipeline, wherein the execution pipeline includes a fetch unit; and a security circuit coupled to the one or more circuit blocks and to the processor, wherein the security circuit is configured to:

determine a pseudo-random value for generating a delay; and delay execution of at least one instruction in the execution pipeline dependent upon the pseudo-random value;

wherein at least one of the one or more resulting events occurs dependent upon the execution of the at least one instruction;

wherein to delay execution of at least one instruction, the security circuit is further configured to cause the fetch unit within the execution pipeline to fetch one or more non-effectual program instructions dependent upon the pseudo-random value.

17. The system of claim 16, further comprising a random number generator circuit configured to generate the pseudo-random value.

18. The system of claim 16, wherein the security circuit is further configured to use the pseudo-random value to cause the fetch unit within the execution pipeline to selectively fetch the one or more non-effectual program instructions in a non-deterministic fetch pattern.

19. The system of claim 16, wherein the security circuit is further configured to halt the execution pipeline non-deterministically dependent upon the pseudo-random value.

20. The system of claim 16, wherein the security circuit is further configured to generate one or more interrupts non-deterministically dependent upon the pseudo-random value, wherein, in response to each of the one or more interrupts, the execution pipeline is configured to execute one or more interrupt service routines, each service routine causing a different non-deterministic pipeline delay.

* * * * *